(12) United States Patent
Holmberg et al.

(10) Patent No.: US 8,917,476 B2
(45) Date of Patent: Dec. 23, 2014

(54) OPERATION OF TAPE DRIVES

(75) Inventors: Mike Alan Holmberg, Eagle, ID (US);
Paul W. Poorman, Meridian, ID (US);
Carl R. Hoerger, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/348,894

(22) PCT Filed: Nov. 16, 2011

(86) PCT No.: PCT/US2011/060959
§ 371 (c)(1),
(2), (4) Date: Mar. 31, 2014

(87) PCT Pub. No.: WO2013/074097
PCT Pub. Date: May 23, 2013

(65) Prior Publication Data
US 2014/0240867 A1    Aug. 28, 2014

(51) Int. Cl.
| G11B 5/008 | (2006.01) |
| G11B 15/44 | (2006.01) |
| G11B 5/40 | (2006.01) |
| G11B 5/584 | (2006.01) |
| G11B 5/31 | (2006.01) |

(52) U.S. Cl.
CPC .......... *G11B 15/444* (2013.01); *G11B 5/00813* (2013.01); *G11B 5/00826* (2013.01); *G11B 5/40* (2013.01); *G11B 5/584* (2013.01); *G11B 5/3106* (2013.01)

USPC .......................................................... 360/90

(58) Field of Classification Search
USPC ........... 360/90, 96.3, 96.4, 130.24; 29/603.01
See application file for complete search history.

(56) References Cited

U.S. PATENT DOCUMENTS

| 5,034,838 A | 7/1991 | Brock et al. |
| 5,751,527 A | 5/1998 | Sundaram et al. |
| 6,690,542 B1 | 2/2004 | Wang |
| 7,050,264 B2 | 5/2006 | Yip et al. |
| 7,414,811 B2 | 8/2008 | Biskeborn |
| 2005/0134991 A1 | 6/2005 | Hansen |
| 2007/0025012 A1 | 2/2007 | Sachuk |
| 2008/0212232 A1* | 9/2008 | Biskeborn ............... 360/130.21 |
| 2008/0266711 A1 | 10/2008 | Nibarger |
| 2009/0027806 A1* | 1/2009 | Biskeborn et al. ............ 360/128 |
| 2012/0008234 A1* | 1/2012 | Biskeborn et al. ......... 360/77.12 |

FOREIGN PATENT DOCUMENTS

EP          0913811          5/1999

OTHER PUBLICATIONS

ISR/WO, PCT/US2011/060959, HP reference 82829613, May 29, 2012, 9 pps.

* cited by examiner

*Primary Examiner* — Allen T Cao (57) ABSTRACT

Tape heads are described herein including (i) a first module including a read transducer array with at least one transducer element to read data from a tape, and (ii) a second module including a read transducer array with at least one transducer element to read data from the tape. In examples herein, a lifting member is provided to cause tape lifting the module at a leading position with respect to tape travel direction.

20 Claims, 9 Drawing Sheets

OPERATION OF TAPE DRIVES

BACKGROUND

Current storage of storage of computer data is implemented in a vast variety of applications. One technique for storing computer data is to record the data in a tape cartridge using a tape drive. For example, data may be recorded on and read from a moving magnetic tape with an electromagnetic read/write head (also referred to as tape head) positioned next to the magnetic tape. During operation of a tape drive, components of a tape head may suffer wear caused by tape contact. Wear of tape head components generally reduces reliability and operational life of a tape drive.

BRIEF DESCRIPTION OF THE DRAWINGS

In order that the present disclosure may be well understood, various examples will now be described with reference to the following drawings.

DETAILED DESCRIPTION

In the following description, numerous details are set forth to provide an understanding of the examples disclosed herein. However, it will be understood that the examples may be practiced without these details. Further, in the following detailed description, reference is made to the accompanying figures, in which various examples are shown by way of illustration. In this regard, directional terminology, such as "top," "bottom," "front," "back," "left," "right," "vertical,", "upper," "lower," etc., is used with reference to the orientation of the figures being described. Because disclosed components can be positioned in a number of different orientations, the directional terminology is used for purposes of illustration and is in no way limiting. Like numerals are used for like and corresponding parts of the various figures.

While a limited number of examples have been disclosed, it should be understood that there are numerous modifications and variations therefrom.

Elements of a tape head arrangement, in particular portions thereof including transducing elements, are generally exposed to wear through tape contact. This wear may be significant in view of tape abrasivity and the intimate contact that may be required between tape and head elements. Further, wear may be accentuated by the relatively high number of passes of the tape across the recording head, particularly in view of the trend to higher number of tracks in a given tape width. Wear may be a major cause of decrease in reliability and operating life of a tape head due to magnetic spacing loss.

Systems and methods are described herein that facilitate reducing wear of a tape head. According to some examples, a tape head is provided including a first module and a second module. Each of the first and second modules includes a read transducer array with at least one transducer element for reading data from the tape. According to some examples, each of the first and second modules may include a write transducer array disposed such that the tape head can perform bi-directional read-after-write by alternately operating these modules depending on the tape travel direction. According to other examples, a write module is provided between the first and second modules so that the tape head can perform bi-directional read-after-write by, (i) writing data using the write module in both directions, and (ii) reading the written data by operating the read transducer elements in the module at trailing with respect to the tape travel direction. It will be understood that other configurations are feasible for implementing read-after-write operation.

Lifting members may be provided so as to cause a lift of a tape portion over the module at the leading position with respect to the tape travel direction. Such lifting members facilitate reducing the wear caused by tape contact on the read elements, which are generally delicate. In particular, lifting members as described herein facilitate distributing wear between the first and the second module. In some arrangements, wear on read elements during bi-directional operation of the tape head may be halved since tape contacts the read transducer only during tape travel in one of these directions. As further detailed below, lifting members may be implemented by suitably designing the contour of the first or second modules (including the read transducer arrays) or by suitably arranging elements adjacent to these modules (e.g., outriggers arranged to cause tape lift as described herein).

The above described lifting members may not interfere with tape head operation since contact with the read transducer array positioned at leading is not strictly required. That is, by including two read transducer arrays and at least one write transducer array, at most only two arrays would be in operation at any given time. Further, as illustrated in examples below, only a read transducer array at a trailing module performs reading during tape displacement in a particular direction. Transducers at a leading module (over which the tape flies by the effect of the lifting members) may remain idle during tape travel in that direction.

Figure 1:
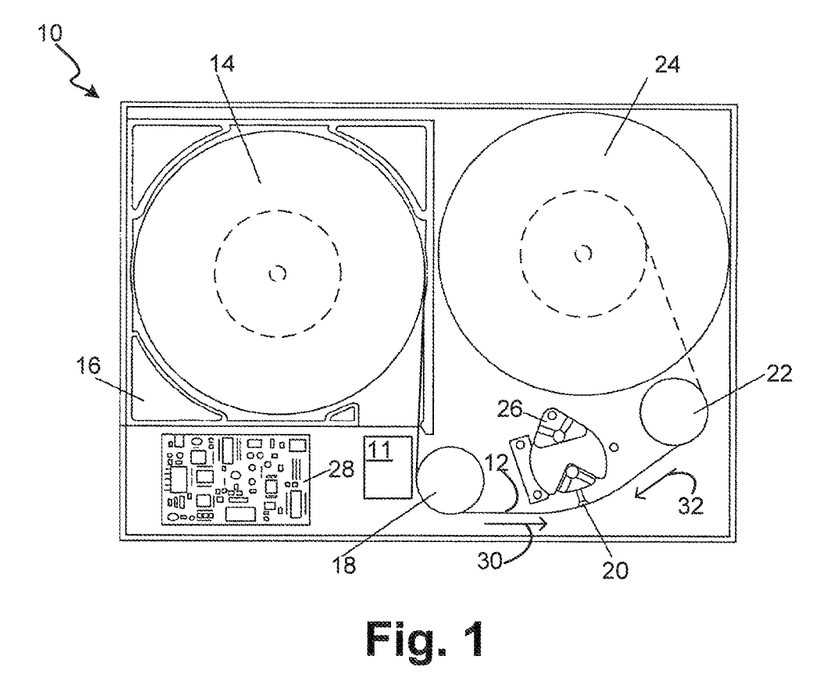
FIG. 1 is a schematic representation of a tape drive according to an example.

FIG. 1 is a schematic representation of a tape drive 10 according to an example. A magnetic tape 12 is initially wound on a supply reel 14 within a magnetic-tape cartridge 16. When loaded into tape drive 10, a tape drive mechanism 11 may cause opening cartridge 16, grasping a leader pin (not shown) mounted to a leader portion of tape 12, and threading tape 12 around a first guide roller 18, over a tape head 20, and around a second guide roller 22 to a take-up reel 24. Further, tape drive mechanism 11 is coupled to supply reel 14 and/or take-up reel 24 for causing tape 12 to travel along tape head 20 during operation of tape drive 10 for writing and/or reading.

Tape head 20 includes elements (e.g., two or more modules including arrays of transducer elements) to write data in and read data from tape 12. Tape head 20 may be particularly adapted for facilitating direct read-after-write operation of tape drive 10. Direct read-after-write is for verifying that a tape drive correctly writes data in a tape by reading written data quasi-simultaneously to writing.

Tape drive 10 may be bi-directionally operated. For example, tape drive 10 may have the capability to write data in and/or read data from tape 12 for alternate directions of tape travel. Such alternate directions may be (i) first travel direction 30 corresponding to travel of tape 12 from supply reel 14 to take-up reel 24, and (ii) second travel direction 32 corresponding to travel of tape 12 from take-up reel 24 to supply reel 14. Tape drive mechanism 11 may be responsible to cause tape 12 to travel either in first travel direction 30 or in second travel direction 32.

Tape head 20 may be moved in a vertical direction (i.e., normal to the plane of the drawing) by an actuator 26 in order to access different sets of tracks for reading and writing. Actuator 26 is, in turn, controlled by a tape-drive controller 28 that includes one or more processors, electronic memory, and logic circuitry. Functions performed by tape-drive controller 28 include, among others, receiving data from, e.g., an external host computer system, processing the data into data sets, writing the data sets to the magnetic tape by electromechanical control of tape head 20, reading data sets from magnetic tape 12 by electromechanical control of tape head 20, or processing the data sets to retrieve the host data that is returned to the host computer system.

Figure 3:
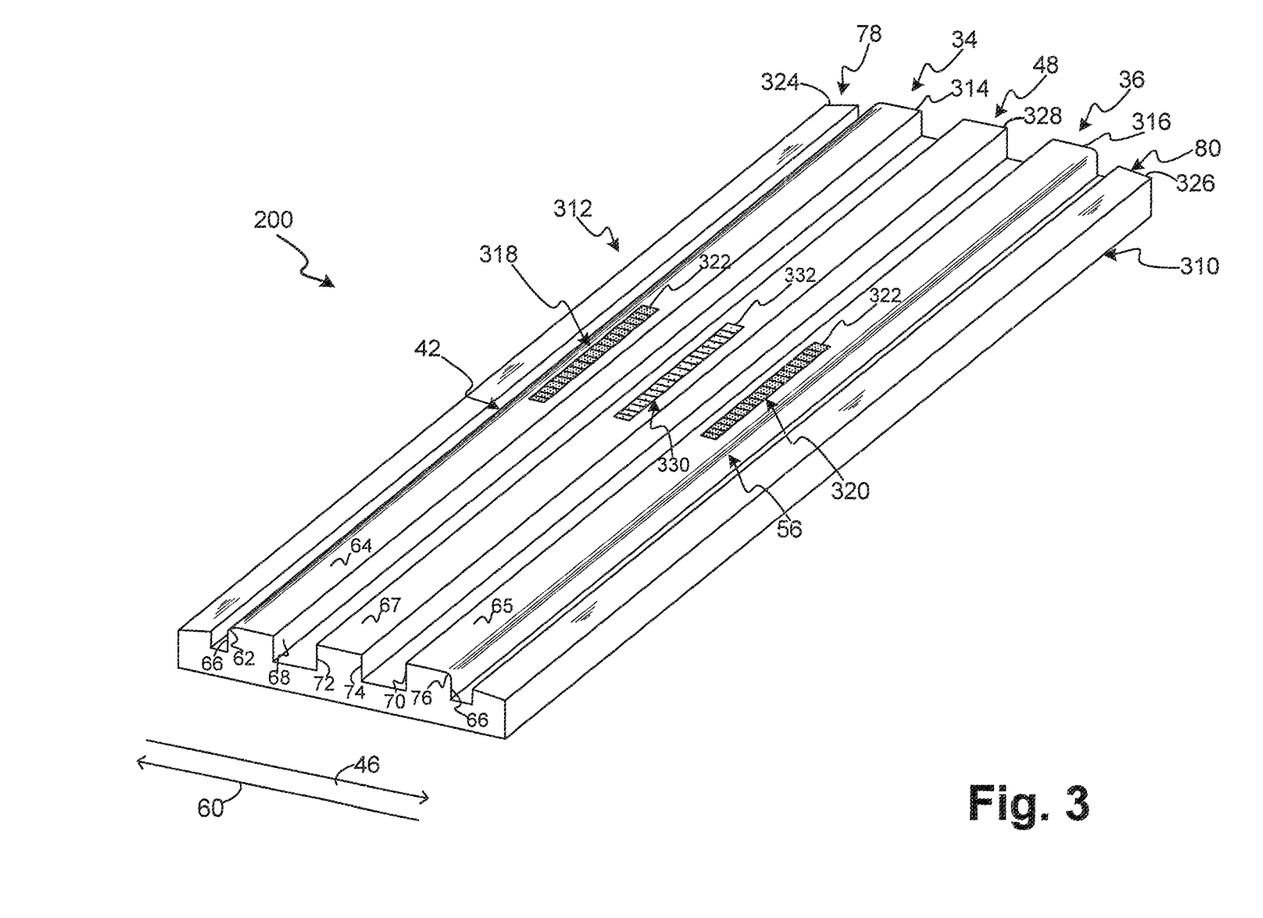
FIG. 3 is a schematic isometric view of a tape head portion corresponding to the example of FIGS. 2A and 2B.

An example of a tape head that may be implemented in tape drive 10 is shown in greater detail in FIG. 3. A tape head arrangement 200 includes a head body 310 adapted to be mounted on a head support (not shown) by suitable mounts. Tape head arrangement 200 includes a tape side 312 configured to face tape 12 during operation of the tape head. Tape head arrangement 200 includes a first module 34 and a second module 36 at tape side 312. Both modules are formed as forwardly protruding and longitudinally extending rails 314, 316. "Forwardly" refers to the direction pointing towards tape 12 when tape head arrangement 200 is in operation.

Outriggers may be implemented in tape head arrangement 200 to facilitate stable dynamic behavior of tape 12 as tape 12 passes over tape side 12. Outriggers are structures disposed at outward portions of the tape head with respect to tape travel direction and arranged to direct a tape into a predetermined path along the tape head and/or precisely set the angle with which the tape overwraps adjacent module of the tape head. In the illustrated example, outriggers 78, 80 are implemented in the form of outer lateral rails 324, 326 extending longitudinally along head body 310.

Each of rails 314, 316 supports a respective read transducer array 318, 320. In the illustrated examples, each of read transducer arrays 318, 320 includes a plurality of read transducer elements 322 extending longitudinally along rails 314, 316. The read transducer elements may be implemented as magnetically sensitive thin-film magneto resistive elements. Rails 314, 316 physically interface with tape 12 as it is moved relative to tape head arrangement 200 so that read transducer array 318, 320 face a data carrying face of tape 12. Rails 314, 316 may further support servo transducer elements (not shown) that interface with servo tracks (not shown) at tape 12 to position the transducers of the tape head relative to data tracks arranged in parallel along tape 12.

In the illustrated example, tape head arrangement 200 further includes at tape side 312 a write module 48. Write module 48 is disposed between first module 34 and second module 36. Write module 48 is formed as a forwardly protruding and longitudinally extending rail 328. Rail 328 supports write transducer array 330. In the illustrated example, write transducer array 330 includes a plurality of transducer elements 332 to write data in tape 12. The write transducer elements 332 may be implemented as write elements including thin-film inductive elements. In the illustrated example, rail 328 of write module 48 includes skiving edges 72, 74 formed in outer portions of rail 328. Each of skiving edges 72, 74 is arranged to skive air from the interface between tape 12 and a tape bearing surface 67 of write module 48 when tape 12 approaches write module 48 towards that particular skiving edge. Write module 48 may further include servo transducer elements (not shown).

While FIG. 3, for purposes of illustration, shows only 18 sets of read/write transducer elements per array, in alternative embodiments arrays 318, 320, 330 may include any number of transducer elements, for example, sixteen read and/or write elements plus two servo elements per array for sixteen data track tape storage technology, or 32 read and/or write elements plus two servo elements per array for 32 data track tape storage technology. Generally, any convenient alternative number and/or suitable arrangement of arrays and transducer elements can be used.

In order to prevent wear, tape head arrangement 200 may include (i) a first lifting member 42 arranged to cause lifting of a tape portion over first module 34 while tape 12 moves in a first direction 46 such that tape 12 encounters, in the following order, first module 34 and second module 36, and (ii) a second lifting member 56 to cause lifting of a tape portion over second module 26 when tape 12 moves in a second direction 60 such that tape 12 encounters, in the following order, second module 34 and first module 36. More specifically, lifting members may be provided such that a lift is caused in the tape portion over the module at the leading position so as to prevent or alleviate wear during operation of tape head arrangement 200.

Figure 2A:
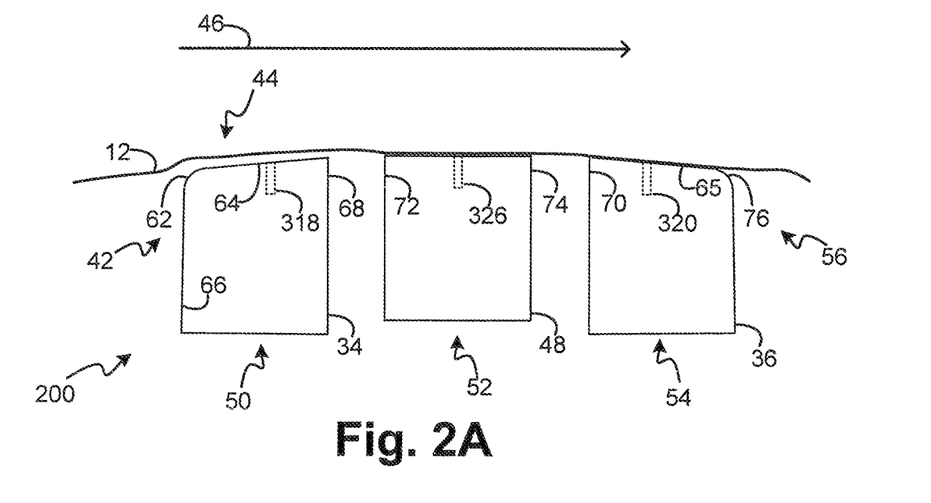
FIGS. 2A and 2B are a schematic representation of bi-directional operation of an example of a tape head in the tape drive of FIG. 1.
Figure 2B:
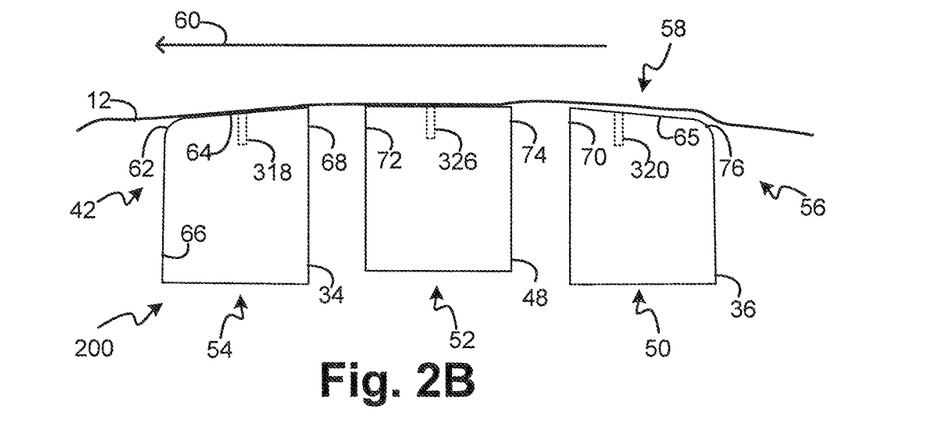

According to some examples herein, first lifting member 42 is integrally formed in first module 34 and/or second lifting member 56 is integrally formed in second module 36. FIGS. 2A, 2B, and 3 show a tape head arrangement according to one of these examples. Further, according to some examples herein, a lifting member is formed at the portion of a module that tape 12 first encounters when moving in the direction in which the lifting member causes tape lift. For example, in these Figures, lifting member 42 is shown implemented at an outward edge of first module 34 and lifting member 56 is implemented at an outward edge of second module 36. In particular, rails 314, 316 include slanted portions 62, 76 built in outward portions of each rail so as to cause tape lift in a given direction.

A slanted portion refers to a portion of a module having a surface with an oblique orientation relative to adjacent surfaces in the module. Slanted portions illustrated herein cause a pressurization of air entering in the interface formed between the slanted portion and the tape, thus creating a self-acting air bearing that causes tape lift over the portion of the transducer portion positioned downstream. A slanted portion eliminates skiving on a tape portion approaching towards the slanted portion. In the illustrated slanted portions 62, 76 are curved portions of rails 314, 316 disposed, respectively, between flat bearing surfaces 64, 65 (supporting the read transducer arrays) and outward vertical surfaces 66 of rails 314, 316.

Slanted portions 62, 76 as illustrated facilitate reducing tape contact on the module at a leading position with respect to the tape travel direction. As will be illustrated below with respect to FIGS. 4A to 6B other elements of tape head arrangement 200 may implement the tape lift function of slanted portions 62, 72.

Slanted portion 62 is shown in FIG. 3 as a curved portion for illustratively purposes. As used herein, a slanted portion may be arranged with any profile suitable for facilitating entraining of air under a tape portion such that a tape lift as described herein is imparted. For example, a slanted portion may be a portion with a curved profile, a beveled profile, a circular profile, or a combination thereof. For example, slanted portion 62 may have a radiused profile with a radius value between 2 and 8 mm, such as 3 mm. As used herein, a radiused profile refers to a profile with a shape according to a portion of a circle.

In the illustrated example, rails 314 and 316 include, respectively, skiving edges 68, 70 formed at inner portions of the rails. Skiving edges 68, 70 are arranged to skive air from the interface between tape 12 and a tape bearing surface 64, 65 of the module when tape 12 approaches a module towards its skiving edge.

FIGS. 2A and 2B illustrate, by way of example, operation of tape head arrangement 200 for bidirectional operation of tape drive 10. For performing read or write operations, tape 12 is brought close to or directly into contact with tape side 312 (see FIG. 3) of tape head arrangement 200 by following a pre-determined path with a pre-determined tension. Generally, the path and tension of tape 12 is determined by the relative spatial configuration of first guide roller 18, tape head arrangement 200, and second guide roller 22.

In order to implement, bi-directional read-after-write operation, a tape drive may operate modules 34, 36 to alternately perform reading depending on the particular tape direction, and write module 48 to perform writing. For example, tape drive 10 may be configured to perform the following process for a read-after-write operation in tape direction 46 using tape head arrangement 200: (i) move tape 12 in direction 46 such that the tape encounters a) first module 34 at a leading position 50, b) write module 48 in a position 52 in-between first module 34 and second module 36, and second module 36 at a trailing position 54; (ii) write data into tape 12 using write module 48; and (iii) read the written data at (ii) from tape 12 immediately after performing (ii) using read transducer array 320 of second module 36 at trailing position 54. During this process, slanted portion 62 causes a lift of tape portion 44 over first module 34 at leading position 50. This lift does not interfere with the read-after-write operation since, in direction 46, read transducer array 318 remains idle while read transducer array 320 at second module 36 performs reading.

Further, tape drive 10 may be configured to perform the following process for a read-after-write operation in tape direction 60: (iv) move tape 12 in direction 60 such that the tape encounters a) second module 36 at a leading position 50, b) write module 48 in a position 52 in-between first module 34 and second module 36, and c) first module 34 at trailing position 54; (v) write data into tape 12 using write module 48 as a write module; (vi) read the data written at (v) from tape 12 immediately after performing (v) using read transducer array 318 of first module 34 at trailing position 54. During this process, slanted portion 76 causes a lift of tape portion 58 over second module 36 at leading position 50. This lift does not interfere with the read-after-write operation since, in direction 60, read transducer array 320 at second module 36 remains idle while read transducer array 318 at first module 34 performs reading.

Bi-directional read-only operation may be analogously implemented by following the above processes omitting writing.

The process taking place during the above operation of tape head arrangement 200 is detailed in the following. As illustrated in FIG. 2A, when tape 12 is moved in direction 46, it first encounter lifting member 42. Slanted portion 62 of lifting member 42 causes a lift of tape portion 44 over first module 34, which is at leading position 50. Since in direction 46, tape 12 encounters first module 34 before write module 48, read transducer array 318 at first module 34 does not perform reading in this direction. Tape 12 flies over read transducer array 318 of first module 34 and encounters skiving edge 72 of write module 48, disposed at position 52 in-between modules 34, 36. Skiving edge 72 causes that tape 12 comes into intimate contact with write transducer array 326 of write module 48 so as to facilitate writing of data in tape 12. Subsequently, tape 12 encounters second module 36 at trailing position 54, in particular its skiving edge 70. Skiving edge 70 causes that tape 12 comes into intimate contact with read transducer array 320 of second module 36 so as to facilitate reading of data written immediately before at write module 48.

As illustrated in FIG. 2B, it will be understood that, when tape 12 is moved in direction 60, the roles of first module 34 and second module 36 are interchanged so that tape flies over second module 36 and read transducer array 318 at first module 34 performs reading in the read-after-write operation described above. In that direction, skiving edge 68 causes intimate contact of tape 12 with read transducer array 318, responsible for reading while tape 12 travels in direction 60.

An arrangement including two lifting members as illustrated herein significantly decreases wear of a module while the tape moves in a direction such that that module is at a leading position. Actually, wear of a read transducer array may be halved as compared to an arrangement which does not implement lifting members as described herein, since tape 12 contacts the outward read transducers only during tape translation in one of the two directions in which the tape drive can be operated. That means that operating life of a tape drive may by doubled since, generally, wear of read transducer elements delimits operating life of the tape drive. (It is noted that, for a given amount of pole tip recession due to wear, performance degradation of a read transducer element is, generally, higher as compared to a write transducer element.)

Figure 4A:
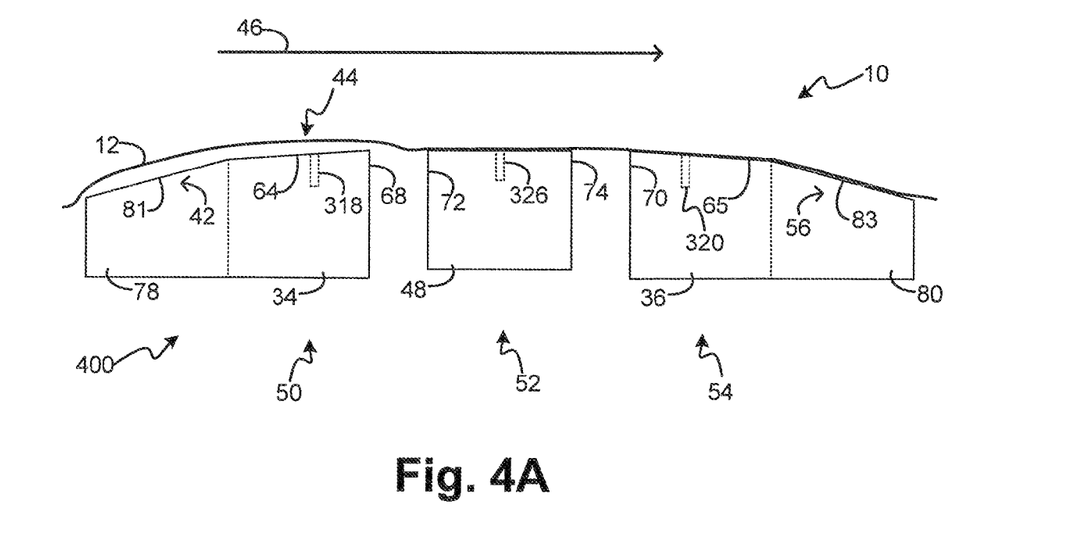
FIGS. 4A and 4B are a schematic representation of bi-directional operation of another example of a tape head in the tape drive of FIG. 1.
Figure 4B:
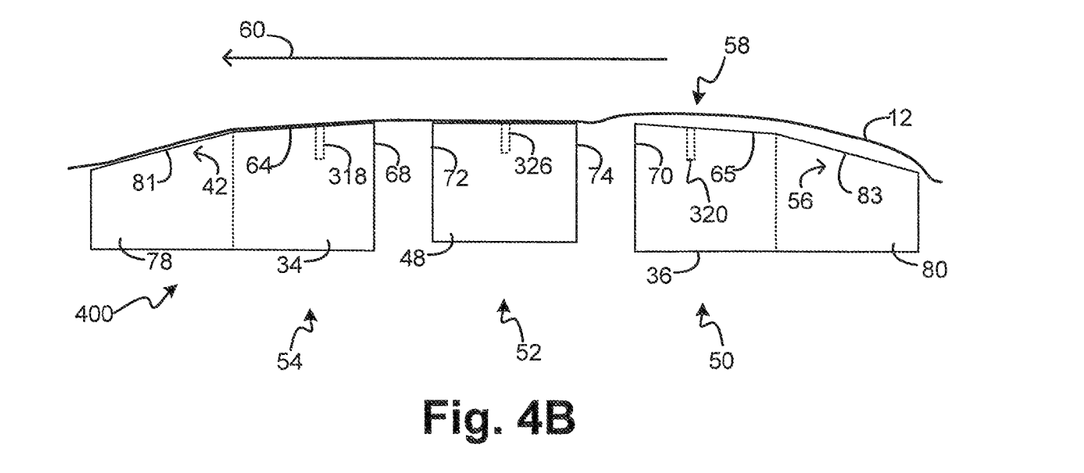
Figure 5:
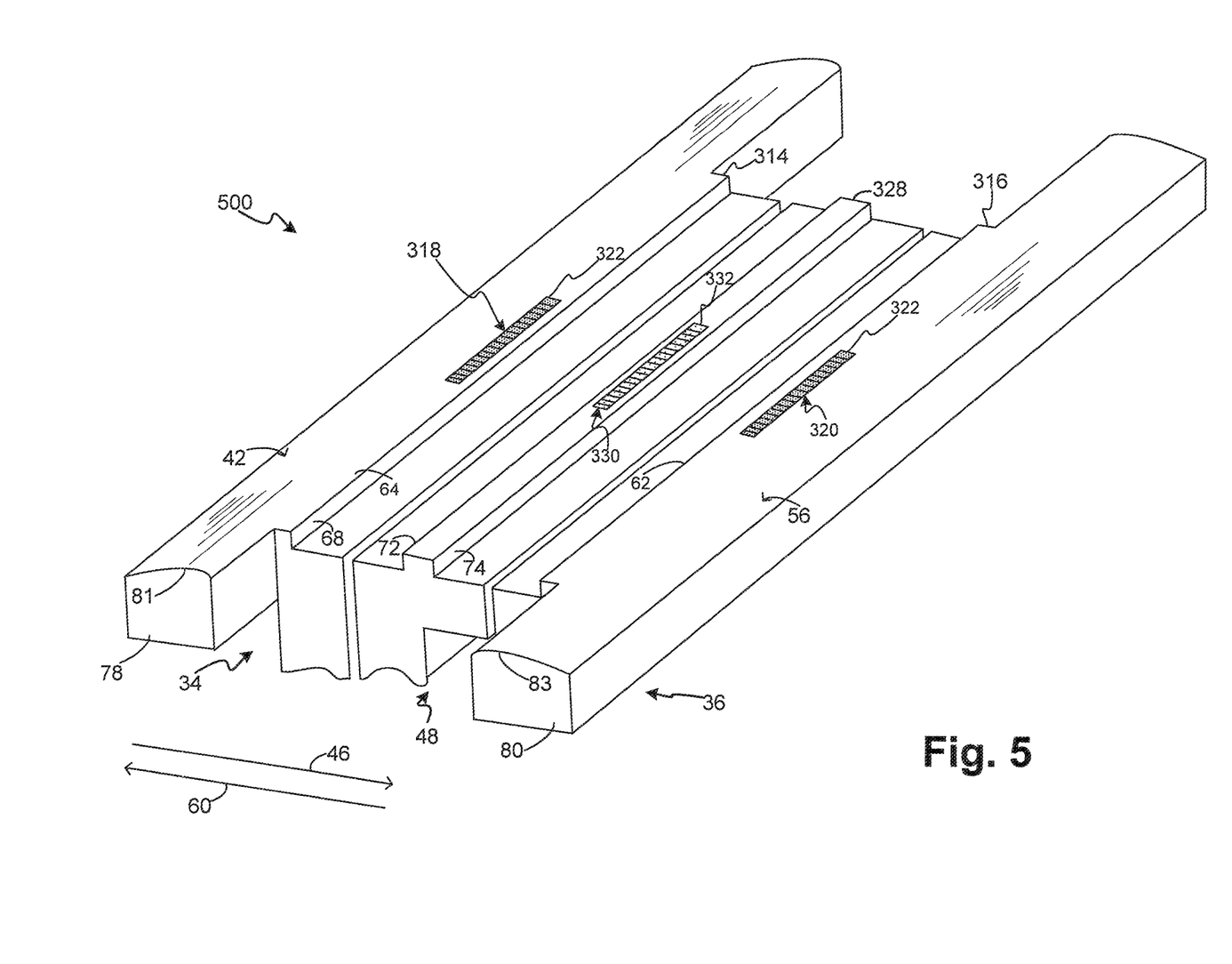
FIG. 5 is a schematic isometric view operation of a tape head portion corresponding to other example.
Figure 6A:
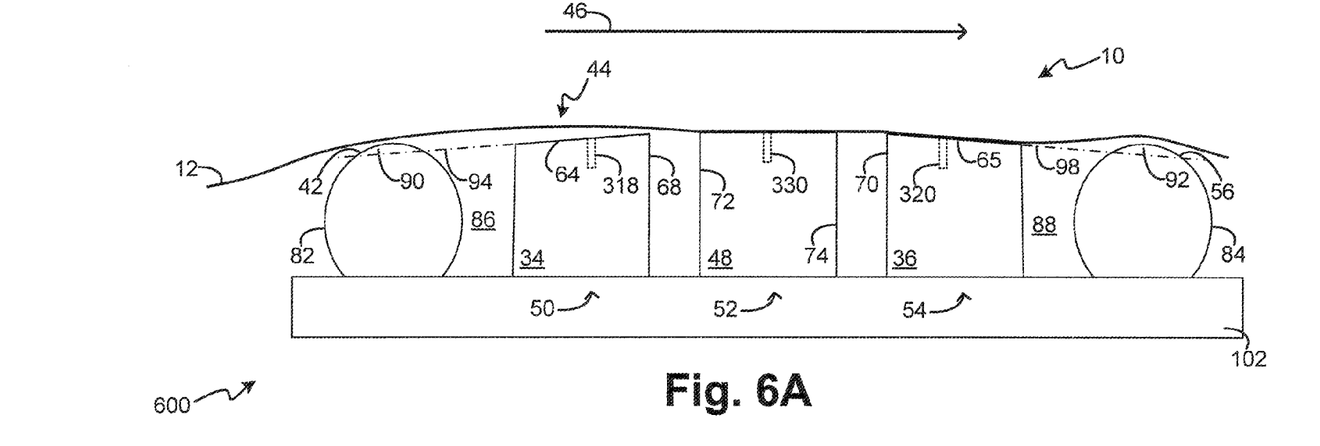
FIGS. 6A and 6B are a schematic representation of bi-directional operation of an example of a tape head in the tape drive of FIG. 1.
Figure 6B:
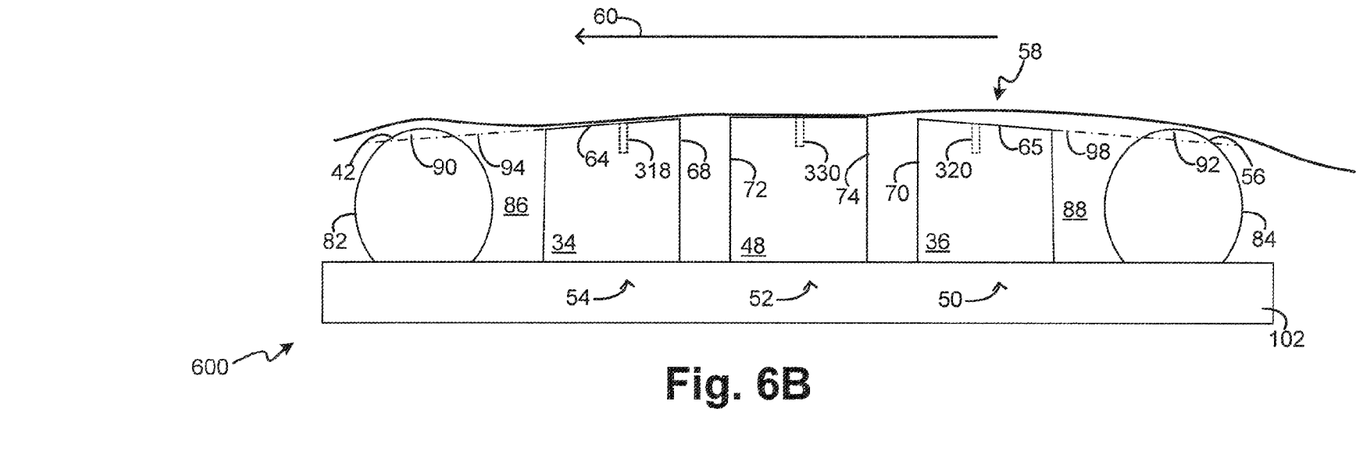

As set forth above, a tape head may include outriggers to direct a tape into a predetermined path along the tape head and/or precisely set the angle with which the tape overwraps adjacent modules of the tape head. An outrigger may be arranged as a separate structure of an adjacent module by providing a recess between the outrigger and an adjacent module, as illustrated in FIGS. 3, 6A, and 6B. Alternatively, outriggers may be integrally formed in an adjacent module. In such integrated outriggers, an upper portion of the outrigger and the module are continuously formed without a recess therebetween, as illustrated in FIGS. 4A to 5. Further, as illustrated in these figures, lifting members may be formed in such integrated outriggers to cause lifting of a tape portion over the adjacent module while the tape travels in the direction in which the tape encounters, first, the integrated outrigger and, subsequently, the adjacent module.

FIGS. 4A and 4B illustrate bi-directional operation of tape head arrangement 400 in an analogous manner as described above with respect to the arrangement in FIGS. 2A and 2B. A tape head arrangement 400 is depicted in which outriggers 78 and 80 are integrated, respectively, in modules 34 and 36. Each of the outriggers includes a lifting member as described above. More specifically, outrigger 78 includes a slanted surface 81 with a profile beveled relatively to flat bearing surface 64 of first module 34 to cause tape lift over that module while tape 12 travels in direction 46; outrigger 80 includes a slanted surface 83 with a profile beveled relative to a flat bearing surface 65 of second module 36 to cause tape lift over that module while tape 12 travels in direction 60. The slanted surfaces may include other type of profiles such as a curved profile, a radiused profile, or a combination thereof. Integrating a lifting member, an outrigger, and a module in the same structure facilitates simplifying tape head design.

FIG. 5 illustrates a tape head arrangement 500 which is a further example of integrated outriggers that include a lifting member. In particular, FIG. 5 shows an isometric view of a tape head arrangement 500 in which outriggers 78, 80 are integrated into first and second modules 34, 36. In the illustrated example slanted surfaces 81, 83 include profiles curved such that a tape portion travelling over a module in the neighborhood of the outrigger and downstream thereof is lifted over that module so as to prevent tape wear. Analogously as for the examples above, such a tape lift does not interfere with operation of the tape head since it only affects a read transducers array in the module at leading with respect to tape travel direction. As set forth above, read-after-write operation may be performed using the module at trailing to perform the reading.

In some examples, outriggers are arranged as a structure separated from an adjacent module by providing a recess between the outrigger and an adjacent module. Such a recess is formed facing a tape portion during operation of the tape head. This is illustrated in tape head arrangement 600 depicted in FIGS. 6A and 6B. FIGS. 6A and 6B illustrate bi-directional operation of a tape head arrangement 600 in an analogous manner as described above with respect to the arrangement in FIGS. 2A and 2B. A first spaced outrigger 82 is disposed in the neighborhood of first module 34 and spaced therefrom by a recess 86. A second spaced outrigger 84 is disposed in the neighborhood of second module 36 and spaced therefrom by a recess 88. Spaced outriggers 78, 80 as well as first module 34, second module 36, and write module 48 are supported by a support structure 102. When tape 12 travels in direction 46, it encounters outrigger 82, traverses recess 86 and encounters first module 34. When tape 12 travels in direction 60, it encounters outrigger 84, traverses recess 88 and encounters second module 36.

According to some examples, such spaced outriggers may include a lifting member to cause lift of a tape portion over the adjacent module when the tape travels from the outrigger to that adjacent module, as illustrated in FIGS. 6A and 6B. Spaced outrigger 82 includes lifting member 42 formed as a raised portion 90. More specifically, raised portion 90 may be arranged over a plane 94 defined by a flat bearing surface 64 of first module 34 to cause lift of tape portion 44 over first module 34 when tape 12 travels in direction 46. Similarly, outrigger 84 may include lifting member 56 formed as a raised portion 92 that is arranged over a plane 98 defined by a flat bearing surface 65 of second module 36 to cause lift of tape portion 58 over second module 36 when tape 12 travels in direction 60.

Raised portions 90, 92 are arranged so as to cause a lift suitable to prevent tape contact with the adjacent reader module while tape 12 travels in a direction in which the reader module is not being operated. Further, the profile of the outriggers may be pre-determined so as to facilitate such a lift. A curved profile of the outrigger generally facilitates that lift by enabling air entraining in the interface between the tape and the adjacent module. Generally, raised portions 90, 92 are designed in consideration of the relative position between the respective outrigger and the adjacent module.

Generally, the more an outrigger is spaced from an adjacent module, the more the portion causing lift should be raised for causing an appropriate tape lift, thus keeping the overwrap angle of the tape over the skiving edge of the head approximately constant. For example, raised portions 90, 92 may be arranged to be raised at least 1 µm over the planes referred to above. More specifically, raised portions 90, 92 may be arranged between 1 and 5 µm over these planes. Further, the highest point of raised portions 90, 92 may be disposed a distance of at least 0.5 µm or, more specifically, between 0.5 and 2 µm from an adjacent transducer. Outriggers integrating lifting members, such as outriggers 82, 84, may be combined with slanted portions integrated in the adjacent modules (such slanted portions are illustrated above with respect to FIGS. 2A and 2B). Thereby, a raised portion of the outrigger and the slanted portion of the transducer may collaborate to cause a lift for preventing tape contact as described herein.

The examples illustrated above include a write module disposed in-between first and second modules arranged to perform reading. According to alternative examples, such write module may be omitted by implementing write transducer arrays in the first and second modules. Such examples are illustrated with respect to FIGS. 7A to 8.

Figure 7A:
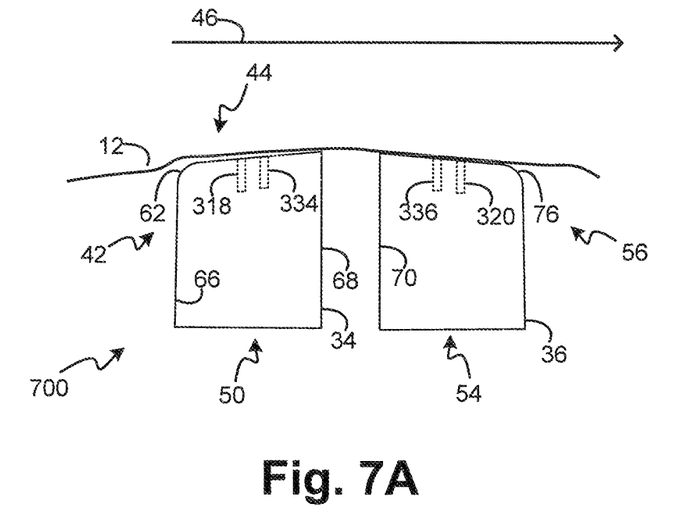
FIGS. 7A and 7B are a schematic representation of bi-directional operation of an example of a tape head in the tape drive of FIG. 1.
Figure 7B:
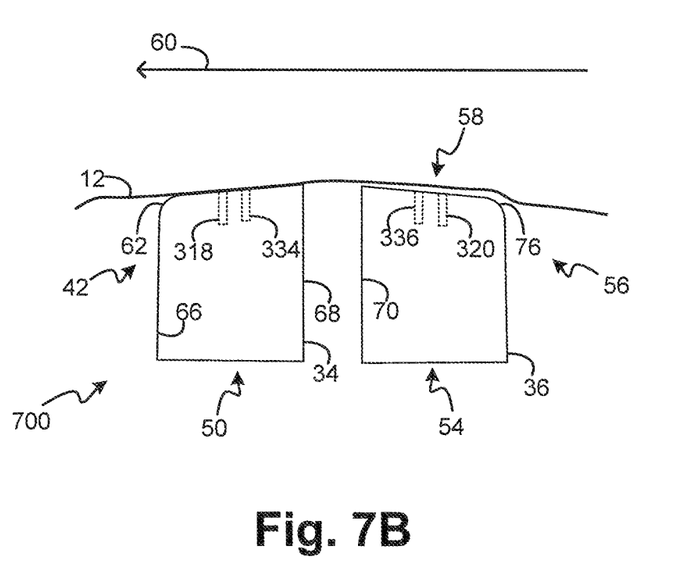
Figure 8:
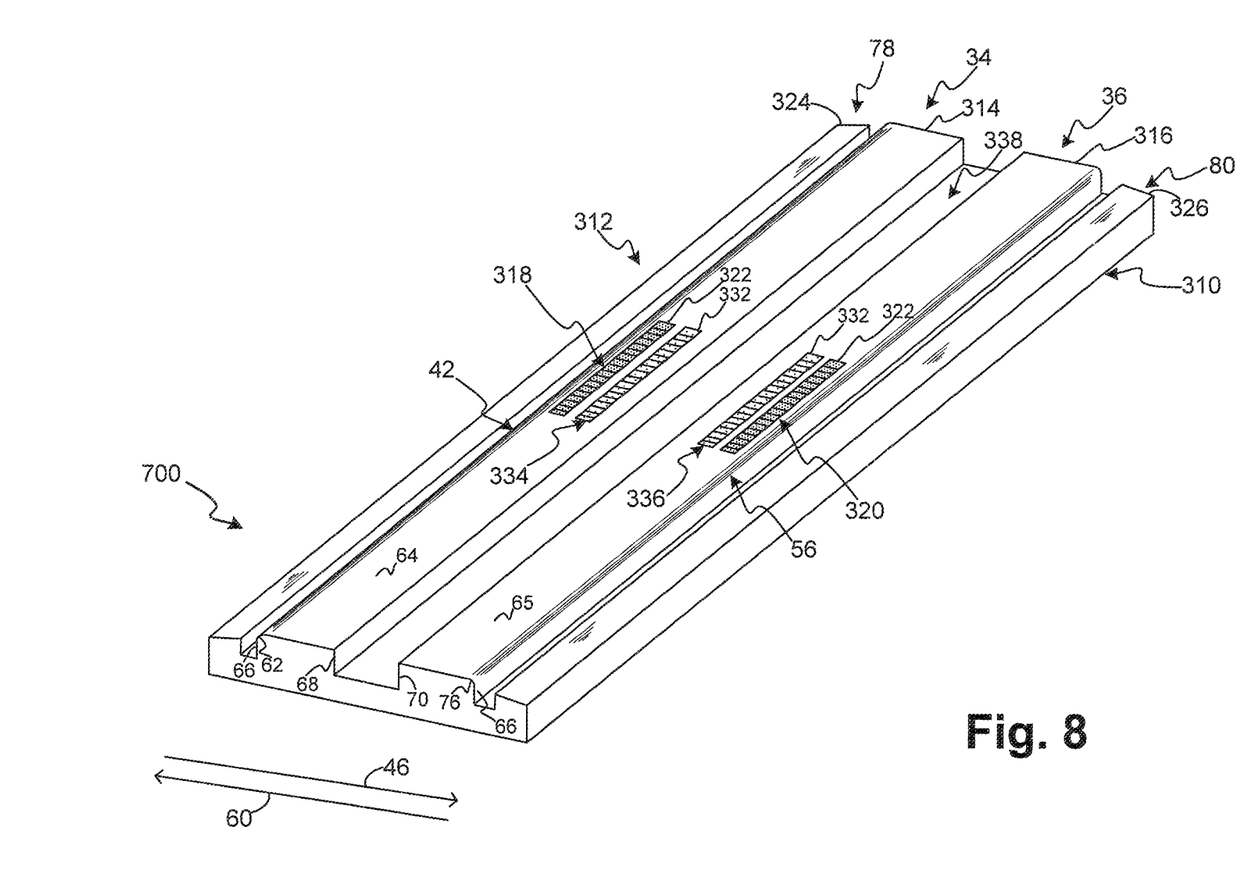
FIG. 8 is a schematic isometric view of a tape head portion corresponding to the example of FIGS. 4A and 4B.

FIGS. 7A and 7B illustrate bi-directional operation of a tape head arrangement 700 in an analogous manner as described above with respect to the arrangement in FIGS. 2A and 2B. Referring to FIG. 8, it can be appreciated that write module 48 is omitted in this example. Instead thereof, for implementing writing, first module 34 includes a write transducer array 334 with write transducer elements 332. More specifically, rail 314 may support write transducer array 334. Write transducer array 334 and read transducer array 318 of first module 34 are aligned such that first module 34 can be operated to perform a read-after-write operation when tape 12 moves in direction 60. In this example, write transducer elements 332 of write transducer array 334 are disposed parallel to read transducer elements 322 of read transducer array 318. Further, write transducer array 334 antecedes read transducer array 318 when tape 12 moves in direction 60. Thereby, when tape 12 translates in direction 60, at first module 314 it first encounters write transducer array 334 and subsequently read transducer array 318.

Further, second module 36 includes a write transducer array 336 with write transducer elements 332. More specifically, rail 316 may support write transducer array 336. Further, write transducer array 336 and read transducer array 320 of second module 36 are aligned such that second module 36 can be operated to perform a read-after-write operation when tape 12 moves in direction 46. In this example, write transducer elements 332 of write transducer array 336 are disposed parallel to read transducer elements 322 of read transducer array 320. Further, write transducer array 336 antecedes read transducer array 320 when tape 12 moves in direction 46. Thereby, when tape 12 translates in direction 46, at second module 316 it first encounters write transducer array 336 and subsequently read transducer array 320. It will be understood that other relative arrangements of the read transducer arrays and write transducer arrays are possible that enable read-after-write operation using transducing elements at one module.

Analogously as for the arrangements illustrated above, tape head arrangement 700 includes lifting members 42 and 56 to cause lifting of tape 12 over the module at a leading position 50. Since the module at trailing may perform read-after-write operation, lifting members 42 and 56 do not interfere in operation of tape head arrangement while alleviating wear at the module at leading.

The process involved in operating tape head arrangement 700 may be as follows. As illustrated in FIG. 7A, when tape 12 is moved in direction 46, it first encounter lifting member 42. Slanted portion 62 of lifting member 42 causes a lift of tape portion 44 over first module 34, which is at leading position 50. In direction 46, the transducer arrays at first module 34 remain idle (in this direction, the transducer arrays at second module 36 are operated). Tape 12 flies over read transducer array 318 and write transducer array 334 of first module 34 and encounters skiving edge 70 of second module 36. Skiving edge 70 causes that tape 12 comes into intimate contact with write transducer array 336 and read transducer array 320 of second module 36 so as to facilitate read-after-write operation using these arrays.

As illustrated in FIG. 7B, it will be understood that, when tape 12 is moved in direction 60, the roles of first module 34 and second module 36 are interchanged so that tape portion 58 is lifted over second module 36 including write transducer array 336 and read transducer array 320; write transducer array 334 and read transducer array 318 at first module 34 are operated to perform the read-after-write operation described above. In that direction, skiving edge 68 causes intimate contact of tape 12 with write transducer array 334 and read transducer array 318, responsible for performing read-after-write in this direction. Examples providing writer transducer arrays at the first and second module as described above facilitate reducing wear of the write transducer elements, since it is facilitated that the tape contacts the write transducer elements only during the tape travel direction in which the write transducer elements are operated. Tape contact with write elements of a module is prevented when that module is at leading.

Figure 9:
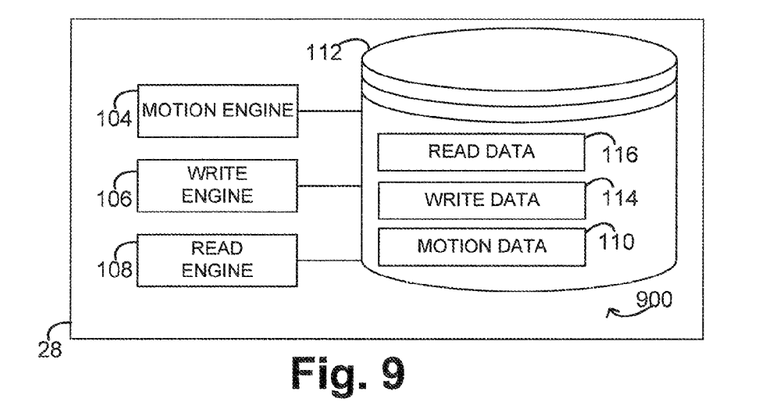
FIG. 9 depicts a system for operating a tape drive according to an example.
Figure 10:
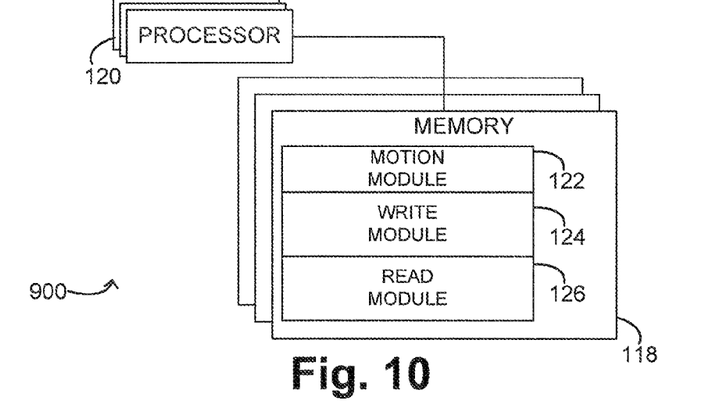
FIG. 10 is a block diagram depicting a computer readable medium according to an example.

FIGS. 9 and 10 depict examples of physical and logical components for implementing operation of a tape drive. FIG. 9 depicts a system 900 for operating a tape drive. In the illustrated example, system 900 is illustrated as forming part of controller 28. It will be understood that system 900 may be provided separately from controller 28, either communicatively coupled thereto or to components of the tape drive system implementing the functions that system 900 controls. In the example, system 900 includes a motion engine 104, a write engine 106, and read engine 108.

Motion engine 104 represents generally any combination of hardware and programming configured to cause moving a tape as described herein. For example, referring to FIG. 1, motion engine 104 may be operatively connected to tape drive mechanism 11 for causing travel of tape 12 in first travel direction 30 or second travel direction 32. Motion engine 104 may cause tape movement in a direction such that the tape encounters a module at a leading position and a module at a trailing position as described above.

In some of the examples illustrated above (e.g., with respect to FIGS. 2A and 2B), motion engine 104 may cause that tape 12 encounters first module 34 at leading position 50 when tape 12 moves in direction 46; motion engine 104 may cause that tape 12 encounters second module 36 at leading position 50 when tape 12 moves in direction 46. As described above, first module 34 and second module 36 may be operated when being at trailing position 54 during a read-after-write operation depending on the tape travel direction. Motion engine 104 may cause tape traveling according to motion data 110 stored in data store 112. Motion data 110 may store data regarding, among other parameters, tape travel direction or tape travel speed.

Motion engine 104 controls tape motion of tape to cause lift of a tape portion while moving the tape in a particular direction to prevent contact with the module at the leading position. Such lift of a tape portion is induced by the travel of the tape close to a shifting member as illustrated above with respect to FIGS. 2 to 8. Generally, the speed of the tape is chosen such that a lifting member causes a tape lift appropriate to prevent tape contact with a module as described above.

Write engine 106 represents, generally, any combination of hardware and programming configured to writing data into a tape using a write transducer array as describe above. For example, referring to FIGS. 2A to 6B, write engine 106 may cause that write transducer array 330 at write module 48 writes data in tape 12 during tape travel in direction 46 or direction 60. Further, referring to FIGS. 7A to 8, write engine 106 may cause (i) write transducer array 336 at second module 36 to write data when tape 12 travels in direction 46, and (ii) write transducer array 334 at first module 34 to write data when tape 12 travels in direction 60.

Read engine 108 represents generally any combination of hardware and programming configured to read written data from a tape using a read transducer array at a module in a trailing position as described above. For example, read engine 108 may cause read transducer array 320 at second module 36 to read data when tape 12 moves in direction 46 (see FIG. 2A, 4A, 6A, or 7A). Further, read engine 108 may cause read transducer array 318 at first module 34 to read data when tape 12 moves in direction 60 (see FIGS. 2B, 4B, 6B, 7B). Read engine 108 may cause storing data read from a tape as part of read data 116 in data store 112.

In foregoing discussion, various components are described as combinations of hardware and programming. Such components may be implemented in a number of fashions. Referring to FIG. 10 the programming may be processor executable instructions stored on a tangible memory medium 118 and the hardware may include a processor 120 for executing those instructions. Memory 118 can be said to store program instructions that when executed by processor 120 implement system 900 of FIG. 8. Memory 118 may be integrated in the same device as processor 120 (e.g., as part of controller 28) or it may be separate but accessible to that device and processor 120.

In one example, the program instructions can be part of an installation package that can be executed by processor 120 to implement system 900. In this case, memory 118 may be a portable medium such as a CD, DVD, or flash drive or a memory maintained by a server from which the installation package can be downloaded and installed. In another example, the program instructions may be part of an application or applications already installed. Here, memory 118 can include an integrated memory such as a hard drive.

In FIG. 10, the executable program instructions stored in memory 118 are depicted as a motion module 122, a write module 124, and a read module 126. Motion module 122 represents program instructions that, when executed, cause the implementation of motion engine 104 of FIG. 8. Likewise, write module 124 represents program instructions that when executed cause the implementation of write engine 106. Likewise, read module 126 represents program instructions that when executed causes the implementation of read engine 108.

Figure 11:
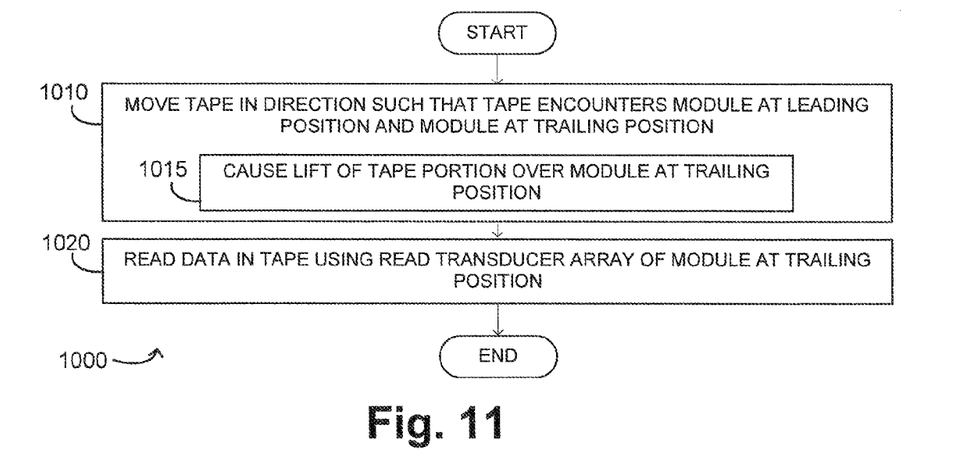
FIG. 11 is a flow diagram depicting a process to implement examples.

FIG. 11 is an example of a flow diagram depicting a process to implement a method as described herein. In particular, process flow 1000 represents an example of a method for operating a tape drive (e.g., tape drive 10). Process flow 1000 may be implemented using a tape head arrangement with multiple modules that can be operated for reading as illustrated above. During tape travel in one particular direction, one of the modules for reading is at a leading position and another is at a trailing position. Further, process flow 1000 may be implemented using a tape head arrangement with a write module disposed in between two modules that respectively include read transducer arrays as illustrated with respect to FIGS. 2A to 6B. Alternatively, process flow 1000 may be implemented using modules that include a write transducer array and a read transducer array as illustrated with respect to FIGS. 7A to 8.

At block 1010, a tape is moved in a direction such that the tape encounters a module at a leading position and a module at a trailing position. Motion engine 104 may be responsible for implementing block 1010 as described above. At block 1020, data is read from the tape using the module at the trailing position. Block 1020 may further include writing data into the tape using a write module in the neighborhood of at least one of the modules. In a read-after-write operation, the data read at block 1020 may be then data that has been previously written by the write transducer, the module at a trailing position being used to perform reading. Alternatively, block 1020 may include writing data into the tape using a write transducer array included in the module at the trailing position; read-after-write operation is then implemented by operating the write and read transducers arrays of the module at the trailing position. Read engine 108 and, optionally, write engine 106 may be responsible to implement block 1020 as described above.

Block 1010 includes a sub-block 1015 of causing a lift of a tape portion by moving the tape over a lifting member. The lifted tape portion is over the module which is at the leading position so as to prevent tape contact therewith. Motion engine 104 in conjunction with a lifting member as described herein (e.g., lifting member 42, lifting member 56) may be responsible to implement block 1015 as described above. More specifically, motion engine 104 may cause tape travel along a lifting module such that an appropriate lift in imparted to a tape portion over a module downstream of the shifting module so as to prevent tape contact therewith. For example, block 1015 may include moving the tape over a slanted portion (e.g., slanted portion 62 in FIG. 4A or slanted portion 76 in FIG. 4B) of the module at the leading position. In other examples, block 1015 may include moving the tape over an outrigger disposed in the neighborhood of the module at the leading position and spaced therefrom (e.g., outrigger 82 in FIG. 6A or outrigger 84 in FIG. 6). As set forth above, an outrigger portion may be over a plane defined by a flat bearing surface of the module at the leading position (e.g., raised portion 90 in FIG. 6A or raised portion 92 in FIG. 6B) so as to cause such lift.

The examples described above facilitate alleviating wear of a tape head. As discussed above, the examples may be successfully deployed by implementing two lifting members. In each of the examples illustrated above, the lifting members in one tape head arrangement are of similar design. For example, in the arrangement of FIG. 3, each lifting member includes a slanted portion to cause lifting of a tape portion over the adjacent module. However, it will be understood that lifting members of different designs may be included in the same tape head arrangement. For example, one tape head arrangement may include a lifting member with a slanted portion to cause tape lift over first module 34 (see FIG. 2A) and a lifting member built in outrigger 84 to cause tape lift over second module 36 (see FIG. 6B). Further, a lifting member may include a combination of elements described above collaborating so as to cause tape lift.

It will be appreciated that examples can be realized in the form of hardware, software module or a combination of hardware and the software module. Any such software module, which includes machine-readable instructions, may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of a non-transitory computer-readable storage medium that are suitable for storing a program or programs that, when executed, for example by a processor, implement embodiments. Accordingly, embodiments provide a program comprising code for implementing a system or method as claimed in any preceding claim and a non-transitory computer readable storage medium storing such a program.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations.

What is claimed is:

1. A tape head comprising:
   a first module including a read transducer array with at least one transducer element to read data from a tape;
   a second module including a read transducer array with at least one transducer element to read data from the tape;
   a first lifting member to cause lifting of a tape portion over the first module while the tape moves in a first direction such that the tape encounters, in the following order, the first module and the second module; and
   a second lifting member to cause lifting of a tape portion over the second module when the tape moves in a second direction such that the tape encounters, in the following order, the second module and the first module.

2. The tape head of claim 1 further comprising a write module including a write transducer array with at least one transducer element to write data from a tape, the write module being disposed between the first module and the second module such that, when the tape moves in the first direction, the tape encounters, in the following order, the first module, the write module and the second module.

3. The tape head of claim 1, wherein
   the first module includes a write transducer array with at least one transducer element to write data, the write transducer array and the read transducer array of the first module being aligned such that the first module can be operated to perform a read-after-write operation when the tape moves in the second direction; and
   the second module includes a write transducer array with at least one transducer element to write data, the write transducer array and the read transducer array of the second module being aligned such that the second module can be operated to perform a read-after-write operation when the tape moves in the first direction.

4. The tape head of claim 1, wherein the first lifting member is integrally formed in the first module and the second lifting member is integrally formed in the second module.

5. The tape head of claim 4, wherein:
   the first lifting member is at the portion of the first transducer module that the tape first encounters when moving in the first direction; and the second lifting member is at the portion of the second transducer module that the tape first encounters when moving in the second direction.

6. The tape head of claim 4, wherein:
the first lifting member includes a slanted portion of the first module; and
the second lifting member includes a slanted portion of the second module.

7. The tape head of claim 6, wherein at least one of the slanted portion of the first module or the slanted portion of the second module includes a portion with a curved profile, a beveled profile, a circular profile, or a combination thereof.

8. The tape head of claim 1, further comprising:
a first outrigger integrally formed in the first module and including the first lifting member; and
a second outrigger integrally formed in the second module and including the second lifting member.

9. The tape head of claim 1, further comprising:
a first outrigger disposed in the neighborhood of the first module, the first outrigger including the first lifting member; and
a second outrigger disposed in the neighborhood of the second module, the second outrigger including the second lifting member.

10. The tape head of claim 9, wherein
each of the first and second modules include a flat bearing surface,
the first lifting member includes a portion of the first outrigger arranged over a plane defined by the flat bearing surface of the first module,
the second lifting member includes a portion of the second outrigger arranged over a plane defined by the flat bearing surface of the second module.

11. The tape head of claim 10, wherein
a portion of the first lifting member is arranged raising at least 1 µm over the plane defined by the flat bearing surface of the first module;
a portion of the second lifting member is arranged raising at least 1 µm over the plane defined by the flat bearing surface of the second module.

12. A tape drive, comprising:
a tape head including
    (i) a first module including a read transducer array with at least one transducer element for reading data, and
    (ii) a second module including a read transducer array with at least one transducer element for reading data;
a motorised drive for causing a tape to move in
    (a) a first direction in which the first module is at a leading position and the second module is at a trailing position, and
    (b) a second direction in which the first module is at a trailing position and the second module is at a leading position;
a first lifting member arranged to cause a lift of a tape portion such that tape contact with the first module is prevented while the tape moves in the first direction;
a second lifting member arranged to cause lift of a tape portion such that tape contact with the second module is prevented while the tape moves in the second direction; and
a circuit to cause
    (i) the read transducer array of the first module to read data from the tape during a read operation in which the tape is moved in the second direction,
    (ii) the read transducer array of the second module to read data from the tape during a read operation in which the tape is moved in the first direction.

13. The tape drive of claim 12 further comprising a write module including a write transducer array with at least one transducer element for writing data, the write module being disposed between the first module and the second module, the circuit to cause
    (i) the write transducer array of the write module to write data in the tape and the read transducer array of the first module to read data from the tape during a read-after-write operation in which the tape is moved in the second direction, and
    (ii) the write transducer array of the write module to write data in the tape and the read transducer array of the second module to read data from the tape during a read-after-write operation in which the tape is moved in the first direction.

14. The tape drive of claim 12, further comprising:
a first outrigger disposed in the neighborhood of the first module, the first lifting member including a portion of the first outrigger disposed over a plane defined by a flat bearing surface of the first module;
a second outrigger disposed in the neighborhood of the second module, the second lifting member including a portion of the second outrigger disposed over a plane defined by a flat bearing surface of the second module.

15. The tape drive of claim 12, wherein
the first module includes a first slanted portion formed as part of the first lifting member;
the first slanted portion is arranged to cause a tape lift preventing contact of the tape with the first module while the tape moves in the first direction;
the second module includes a second slanted portion formed as part of the second lifting member;
the second slanted portion is arranged to cause a tape lift preventing contact of the tape with the second module while the tape moves in the second direction.

16. A method for operating a tape drive, the method including:
moving a tape in a direction such that the tape encounters a module at a leading position and a module at a trailing position, each of the modules including a read transducer array with at least one transducer element for reading data from the tape; and
reading data from the tape using the read transducer array of the module at the trailing position with respect to a direction of tape travel; wherein
moving the tape includes moving the tape over a lifting member so as to cause a lift of a tape portion over the module at the leading position while moving the tape in said direction.

17. The method of claim 16, wherein reading data includes reading data written using a write transducer array of a write module disposed in-between said modules, the write transducer array including at least one transducer element for writing.

18. The method of claim 16, wherein reading data includes reading data written using a write transducer array of the module at the trailing position, the write transducer array including at least one transducer element for writing.

19. The method of claim 16, wherein moving the tape includes moving the tape over a slanted portion of the module at the leading position so as to cause the lift of the tape portion.

20. The method of claim 16, wherein moving the tape includes moving the tape over an outrigger disposed in the neighborhood of the module at the leading position, an outrigger portion being over a plane defined by a flat bearing surface of the module at the leading position, the outrigger portion causing the lift of the tape portion.

* * * * *